United States Patent
Park et al.

(10) Patent No.: US 8,150,466 B2
(45) Date of Patent: Apr. 3, 2012

(54) APPARATUS FOR DETACHABLY INSTALLING A SMART CARD IN A PORTABLE TERMINAL

(75) Inventors: Jung-Bae Park, Daegu (KR); Yong-Woo Jeon, Gumi-si (KR); Byoung-Joo Yi, Gumi-si (KR); Gyu-Bok Lee, Daegu (KR); Sung-Sun Park, Gumi-si (KR); Young-Jun Jung, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1208 days.

(21) Appl. No.: 11/844,107

(22) Filed: Aug. 23, 2007

(65) Prior Publication Data

US 2008/0096606 A1    Apr. 24, 2008

(30) Foreign Application Priority Data

Oct. 23, 2006  (KR) .................. 10-2006-0102998
Mar. 5, 2007   (KR) .................. 10-2007-0021440

(51) Int. Cl.
*H04M 1/00* (2006.01)
(52) U.S. Cl. ............. 455/558; 455/575.1; 361/600; 439/1
(58) Field of Classification Search .......... 455/588, 455/575.1; 361/600; 439/1
See application file for complete search history.

(56) References Cited

U.S. PATENT DOCUMENTS

| 5,764,476 | A  | * | 6/1998  | Ohgami et al. ........ 361/679.27 |
| 6,261,128 | B1 | * | 7/2001  | Heim et al. ................. 439/630 |
| 6,304,454 | B1 | * | 10/2001 | Akamatsu et al. ........... 361/752 |
| 7,066,748 | B2 | * | 6/2006  | Bricaud et al. ............... 439/159 |
| 7,764,977 | B2 | * | 7/2010  | Kemppinen ................ 455/558 |
| 2002/0014528 | A1 | * | 2/2002 | Shiue ......................... 235/441 |
| 2003/0195020 | A1 | | 10/2003 | Kubo |
| 2005/0124191 | A1 | | 6/2005  | Stanton et al. |
| 2006/0073848 | A1 | * | 4/2006 | Kwon ......................... 455/558 |

FOREIGN PATENT DOCUMENTS

| EP | 1 174 957 A2 | 1/2002 |
| EP | 1 647 923 A2 | 4/2006 |
| JP | 2001-094272 A | 4/2001 |
| KR | 10-2006-0019647 A | 3/2006 |

* cited by examiner

*Primary Examiner* — Nghi Ly
(74) *Attorney, Agent, or Firm* — Jefferson IP Law, LLP (57) ABSTRACT

An apparatus for detachably installing a smart card, such as a Subscriber Identity Module (SIM) card, in a portable terminal is provided. The apparatus includes an opening on the portable terminal, a sliding member slidably coupled to the terminal to move in and out of the opening, and a cover on an end portion of the sliding member to open and close the opening as the sliding member slides. The SIM card is placed on the sliding member to move in and out of the opening through a sliding movement of the sliding member. The apparatus prevent damage to the SIM card when it is detachably installed in the portable terminal through the sliding movement of the sliding member.

28 Claims, 7 Drawing Sheets

APPARATUS FOR DETACHABLY INSTALLING A SMART CARD IN A PORTABLE TERMINAL

PRIORITY

This application claims the benefit under 35 U.S.C. §119 (a) of Korean patent applications filed in the Korean Industrial Property Office on Oct. 23, 2006 and Mar. 5, 2007, and assigned Serial Nos. 2006-102998 and 2007-21440, respectively, the entire disclosures of which are hereby incorporated by reference.

BACKGROUND OF THE INVENTION

1. Field of the Invention

The present invention relates to a portable mobile communication terminal. More particularly, the present invention relates to an apparatus for detachably installing a smart card, such as a Subscriber Identity Module (SIM) card, in a portable terminal.

2. Description of the Related Art

Generally, due to consumer demand, portable terminals have been developed to be made smaller and to have multiple functions, including functions such as carrying out voice communication, listening to radio broadcasting, listening to music through downloading music files via Internet access, viewing moving pictures, and the like. In addition, it is possible to send and receive text messages with other users using a key pad device of portable terminals.

As portable terminals become universal and are used more and more, terminals with diverse functions and designs are coming out onto the stage. In addition, terminals are being made smaller, lighter, thinner, and shorter, and the diversity of their functions is emerging furthermore as well. Portable terminals use various types of protocols, including a European Global System for Mobile communication (hereinafter, referred to as "GSM"), a North American Time Division Multiple Access (TDMA), and a Code Division Multiple Access (CDMA), which are widely used. Among these protocols, GSM is an international standard for securing compatibility between the operations of diverse networks, and is increasing in use in many countries in the world as well as Europe. A Subscriber Identity Module (SIM) card or a Removable-User Identity Module (R-UIM) card used in a GSM device is detachably installed in a portable terminal to store data including information required to operate the portable terminal, such as a subscriber's personal information such as a password, a telephone number, a network number, and the like.

A SIM card is connected to a socket provided in a portable terminal so that it is possible to check and use the diverse data stored in the SIM card via the portable terminal.

A SIM card is generally installed on a lower case where a battery pack of a portable terminal is installed, so that upon installing the SIM card, a user must first remove the battery pack. Accordingly, it is inconvenient for a user to install and remove a SIM card from a portable terminal, and may result in damage to the SIM card when it is removed from the portable terminal.

SUMMARY OF THE INVENTION

An aspect of the present invention is to address at least the above problems and/or disadvantages and to provide at least the advantages described below. Accordingly, an aspect of the present invention is to provide an apparatus for detachably installing a smart card, such as a Subscriber Identity Module (SIM) card, in a portable terminal by sliding the smart card.

Another aspect of the present invention is to provide an apparatus for detachably installing a smart card, such as a Subscriber Identity Module (SIM) card, in a portable terminal that is capable of preventing the smart card from being damaged while being removed from a portable terminal.

In accordance with an aspect of the present invention, an apparatus for detachably installing a smart card, such as a Subscriber Identity Module (SIM) card, in a portable terminal is provided. The apparatus includes an opening on the portable terminal, a sliding member slidably coupled to the terminal to move in and out of the opening, and a cover provided to an end portion of the sliding member to open and close the opening as the sliding member slides. The smart card is placed on the sliding member to move in and out through the opening by the movement of the sliding member.

In accordance with another aspect of the present invention, an apparatus for detachably installing a smart card, such as a Subscriber Identity Module (SIM) card, in a portable terminal is provided. The apparatus includes an opening on the portable terminal to receive the smart card, a sliding member slidably coupled to the terminal, and a cover provided to an end portion of the sliding member to open and close the opening. The smart card is disposed substantially parallel with the sliding member while being inserted into the opening as the cover closes the opening, and the smart card is drawn out from the opening as the cover opens the opening.

BRIEF DESCRIPTION OF THE DRAWINGS

The above and other aspects, features and advantages of the present invention will be more apparent from the following detailed description of certain exemplary embodiments taken in conjunction with the accompanying drawings, in which.

Throughout the drawings, like reference numerals will be understood to refer to like parts, components and structures.

DETAILED DESCRIPTION OF THE EXEMPLARY EMBODIMENT

The following description with reference to the accompanying drawings is provided to assist in a comprehensive understanding of the exemplary embodiments of the invention as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention. Also, descriptions of well-known functions and constructions are omitted for clarity and conciseness.

Figure 1:
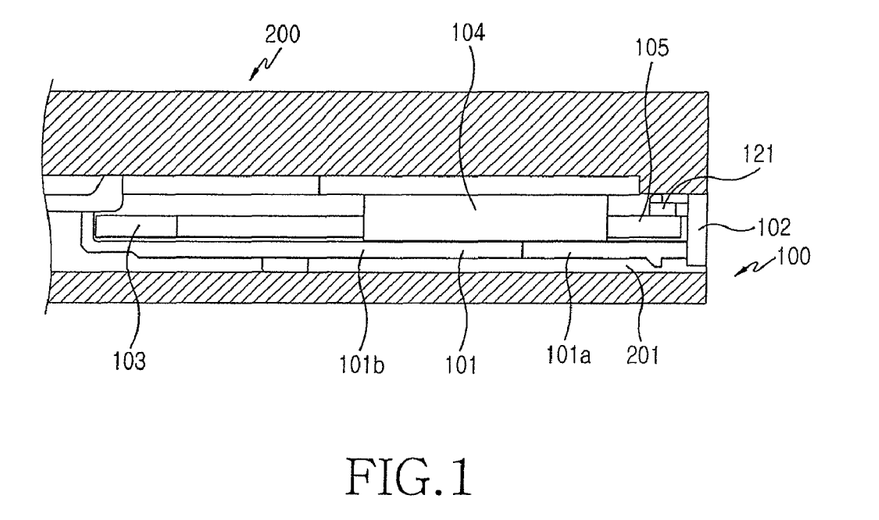
FIG. 1 is a cross sectional view of an apparatus for detachably installing a Subscriber Identity Module (SIM) card in a portable terminal according to an exemplary embodiment of the present invention.
Figure 2:
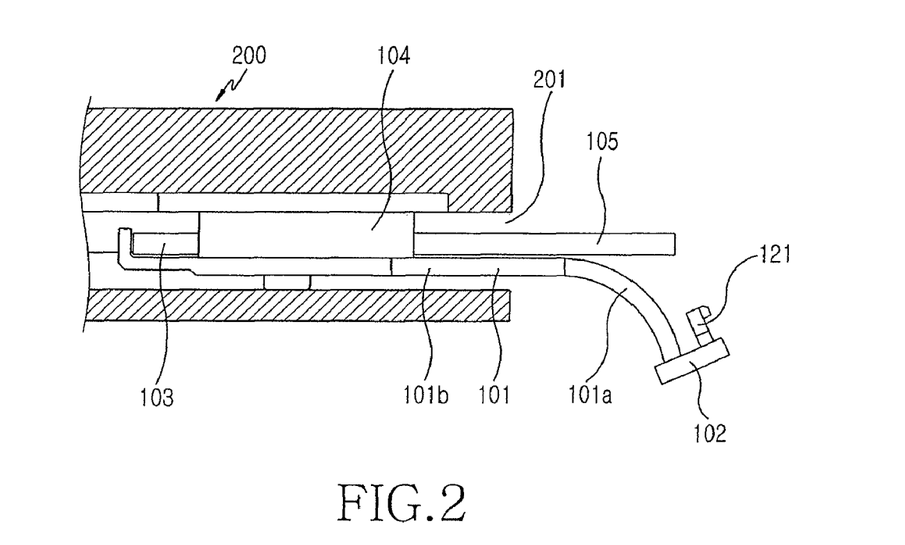
FIG. 2 is a cross sectional view illustrating a state where a sliding member of the apparatus for detachably installing the SIM card in a portable terminal shown in FIG. 1 is moved out.

FIG. 1 is a cross sectional view of an apparatus 100 for detachably installing a smart card, such as a Subscriber Identity Module (SIM) card, in a portable terminal 200 according to an exemplary embodiment of the present invention, and FIG. 2 is a cross sectional view illustrating a state where a sliding member 101 of the apparatus 100 for detachably installing a SIM card in a portable terminal shown in FIG. 1 is moved out. As shown in FIGS. 1 and 2, the SIM card installing apparatus 100 of the portable terminal 200 according to an exemplary embodiment of the present invention includes a sliding member 101 and a cover 102. In the exemplary embodiment, the SIM card installing apparatus 100 is installed in the opening 201 disposed on an end surface of the portable terminal 200 to allow the SIM card 105 to be loaded into and out of the portable terminal 200.

The sliding member 101 is slidably coupled to the portable terminal 200 to move in and out of the opening 201. The SIM card 105 is placed on one surface of the sliding member 101. The sliding member 101 includes first and second sliders 101a and 101b, so that a first portion of the SIM card 105 is placed on the first slider 101a and a second portion is placed on the second slider 101b.

The first slider 101a is positioned at an inlet of the opening 201 when loaded therein, and includes a soft (that is, flexible) material, such as a general urethane. The first slider 101a thus may be deformed by an external force.

The second slider 101b extends from an end of the first slider 101a, and includes a relatively rigid material. A buffer 103 composed of a soft material is provided at one surface of the second slider 101b to support an end portion of the SIM card 105 on the second slider 101b. Further, the second slider 101b is bent at one end to surround a portion of the buffer 103, securely fixing it. Accordingly, the buffer not only allows the SIM card 105 to be stably placed on the second slider 101b, but also prevents the SIM card 105 from being damaged.

The cover 102 is connected to the first slider 101a of the sliding member 101 so that as the sliding member 101 slides, it opens and closes the opening 201. In addition, a cover projection 121 is disposed on one surface of the cover 102. The cover projection 121 is made of a hard material, and engages a portion of the SIM card 105 placed on the first slider 101a in association with the cover 102. Generally, the hard material is fabricated by injection molding of a polycarbonate (PC) material.

The opening 201 is provided with a SIM socket 104, in which the SIM card 105 placed on the sliding member 101 is to be loaded. The SIM card 105 placed on the sliding member 101 is installed in the opening 201 in such a manner that while being inserted into the opening 201, it passes by and is mounted in the SIM socket, being supported by the buffer 103. When the SIM card 105 has been installed in the opening 201, the SIM socket 104 surrounds the SIM card 105.

In addition, although not illustrated, the opening 201 and the SIM card 105 are provided with a receiving connector and a connecting terminal, respectively. When the SIM card 105 is installed in the SIM socket 104, the connecting terminal is connected with the receiving connector. Accordingly, data including relevant information stored in the SIM card such as a subscriber's personal information such as a password, a telephone number, a network number, and other information is ready to be offered to the portable terminal 200.

Figure 3:
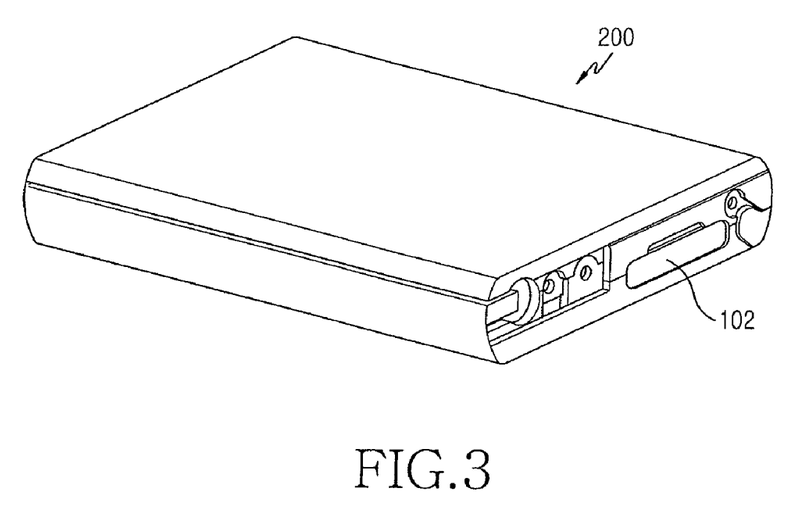
FIG. 3 is a perspective view of an exemplary embodiment of a portable terminal provided with the apparatus shown in FIG. 1.
Figure 4:
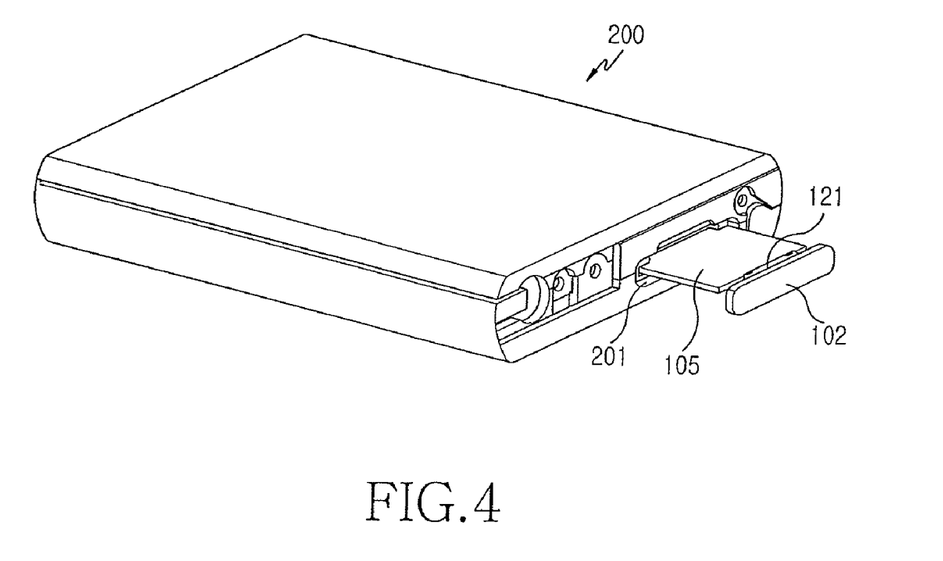
FIG. 4 is a perspective view illustrating a state where a cover of the apparatus shown in FIG. 1 is separated from the portable terminal.
Figure 5:
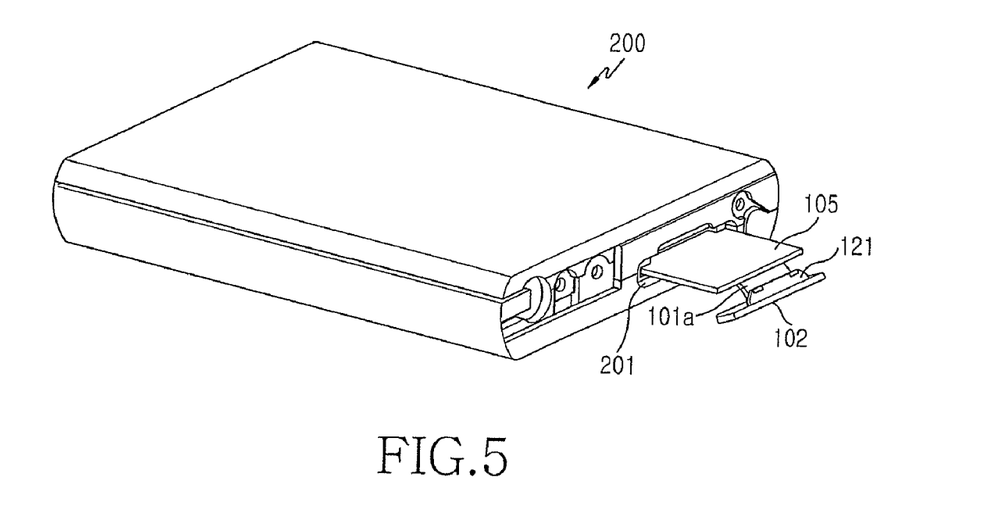
FIG. 5 is a perspective view illustrating a state where a cover of the apparatus shown in FIG. 1 is separated from the SIM card.
Figure 6:
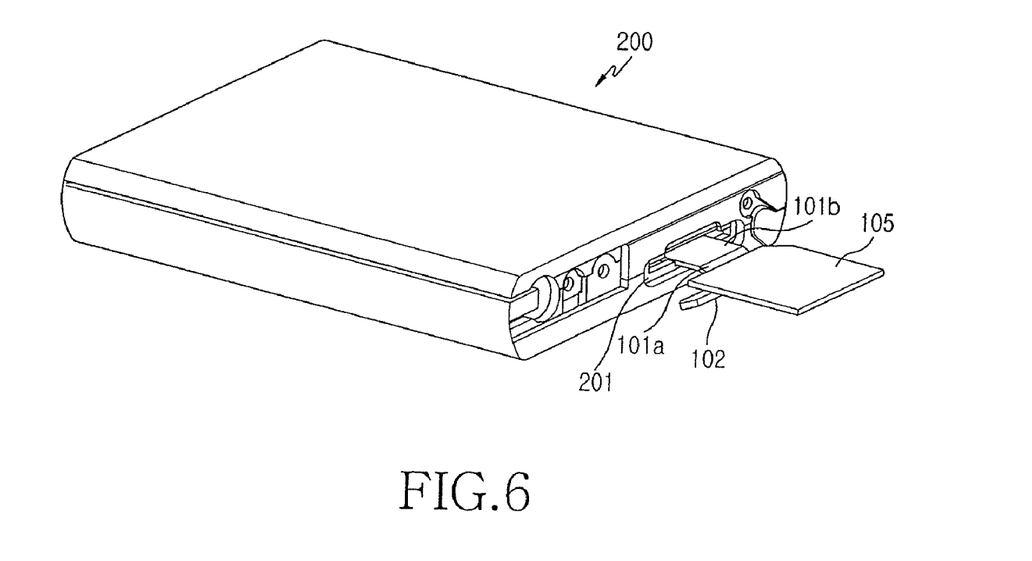
FIG. 6 is a perspective view illustrating a state where the SIM card is separated from the apparatus shown in FIG. 1.

FIG. 3 is a perspective view of the portable terminal 200 provided with the SIM card installing apparatus 100 shown in FIG. 1, FIG. 4 is a perspective view illustrating a state where the cover 102 of the apparatus 100 shown in FIG. 1 is separated from the portable terminal 200, FIG. 5 is a perspective view illustrating a state where the cover 102 of the apparatus 100 shown in FIG. 1 is separated from the SIM card 105, and FIG. 6 is a perspective view illustrating a state where the SIM card 105 is separated from the apparatus 100 shown in FIG. 1. Referring to FIGS. 3 to 6, the SIM card installing apparatus 100 of the portable terminal 200 is operated as follows.

When the cover 102 closes the opening 201, the SIM card 105 located on the sliding member 101 is installed in the SIM socket 104. Further, the SIM card 105 engages the cover 102 by the cover projection 121, and is supported by the buffer 103 and the cover 102.

When a user tries to draw out the SIM card 105 from the portable terminal 200, he/she should move the cover 102 closing the opening 201 to the outside of the portable terminal 200. As the cover 102 is moved out from the opening 201, the sliding member 101 is also moved out. At this time, the SIM card 105 is drawn out from the opening 201 at the same time it is drawn out from the SIM socket 104 while the connecting terminal of the SIM card 105 is disconnected from the receiving connector of the SIM socket 104.

When the cover projection 121 is separated from the SIM card 105, the cover 102 is then separated from the SIM card 105. At this time, the shape of the first slider 101a is deformed so that the first slider 101a moves gradually away from the SIM card 105 when moving from the second slider 101b side to the cover 102 side.

At this time, while a first portion of the SIM card 105 is separated from the first slider 101a, the second portion thereof is placed on the second slider 101b. The SIM card 105 can thus be separated from the second slider 101b. Moreover, the SIM card 105 is unloaded from the opening 201 at the same time it is separated from the second slider 101b. As a result, the SIM card 105 is unloaded from the portable terminal 200.

When the SIM card 105 is to be installed again in the portable terminal 200, the second portion of the SIM card 105 should be placed on the second slider 101b while being inserted into the opening 201. Further, the SIM card 105 is placed on first and second sliders 101a and 101b as it engages the cover 102 by the cover projection 121 simultaneously with being supported by the buffer 103.

When a user applies force to the cover 102 in the direction of the opening 201, the cover 102 is moved toward the opening 201, and the sliding member 101 on which the SIM card 105 is placed is also moved. When the cover 102 closes the opening 201, the SIM card 105 is installed in the portable terminal 200 through being also installed in the SIM socket 104. It then enters a state where data including relevant information stored in the SIM card 105 such as a subscriber's personal information such as a password, a telephone number, a network number, and other information, is ready to be offered to the portable terminal 200.

Figure 7:
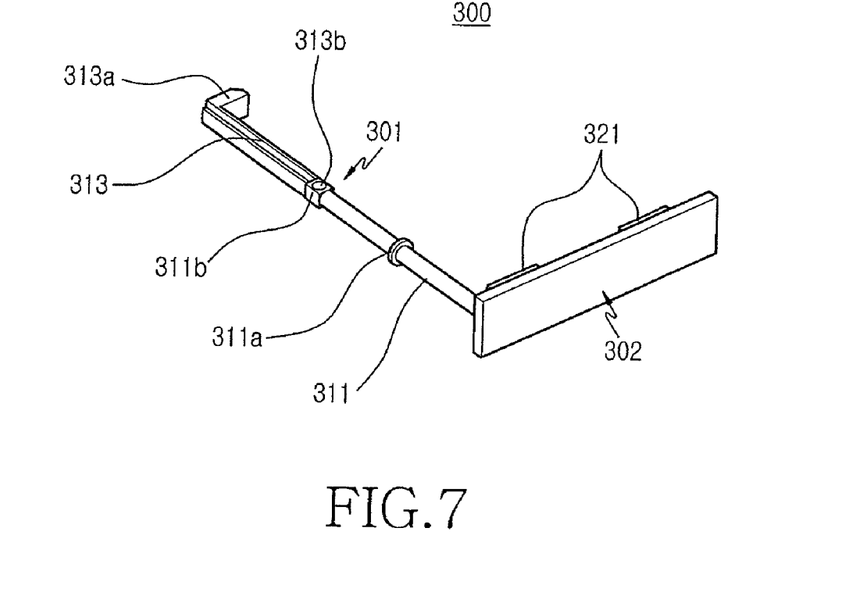
FIG. 7 is a perspective view of an apparatus for detachably installing a Subscriber Identity Module (SIM) card in a portable terminal according to another exemplary embodiment of the present invention.
Figure 8:
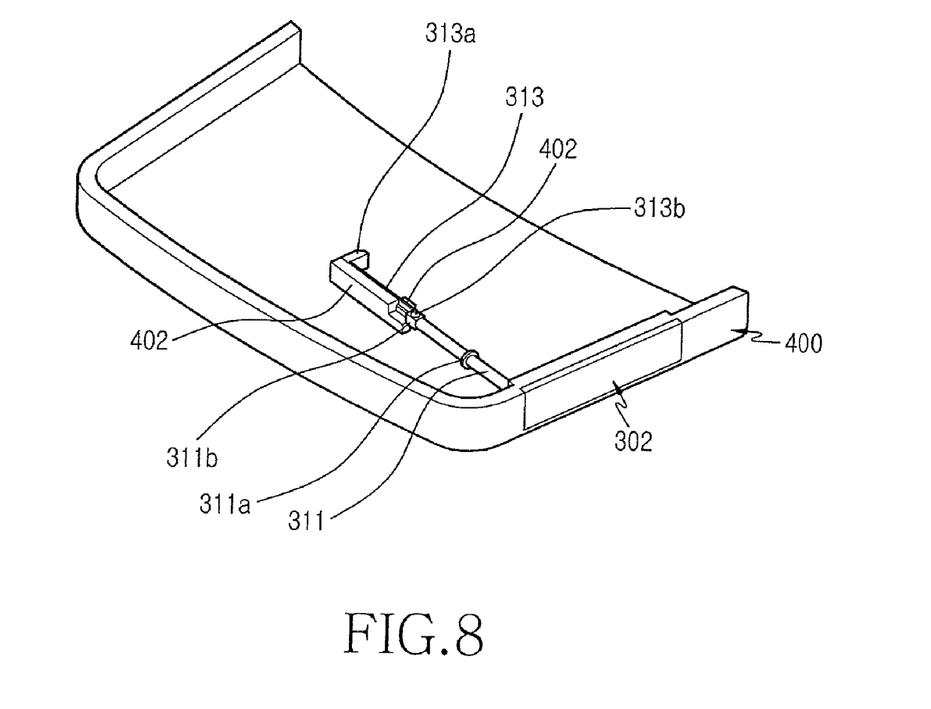
FIG. 8 is a perspective view of an exemplary embodiment of a portable terminal provided with the apparatus shown in FIG. 7.
Figure 9:
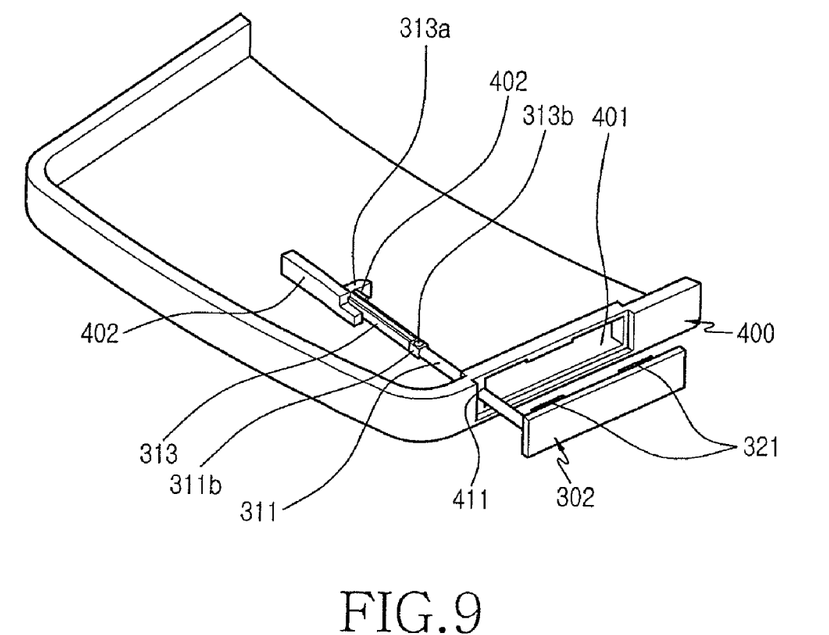
FIG. 9 is a perspective view illustrating a state where a sliding member of the apparatus for detachably installing the SIM card in the portable terminal shown in FIG. 8 is moved out.
Figure 10:
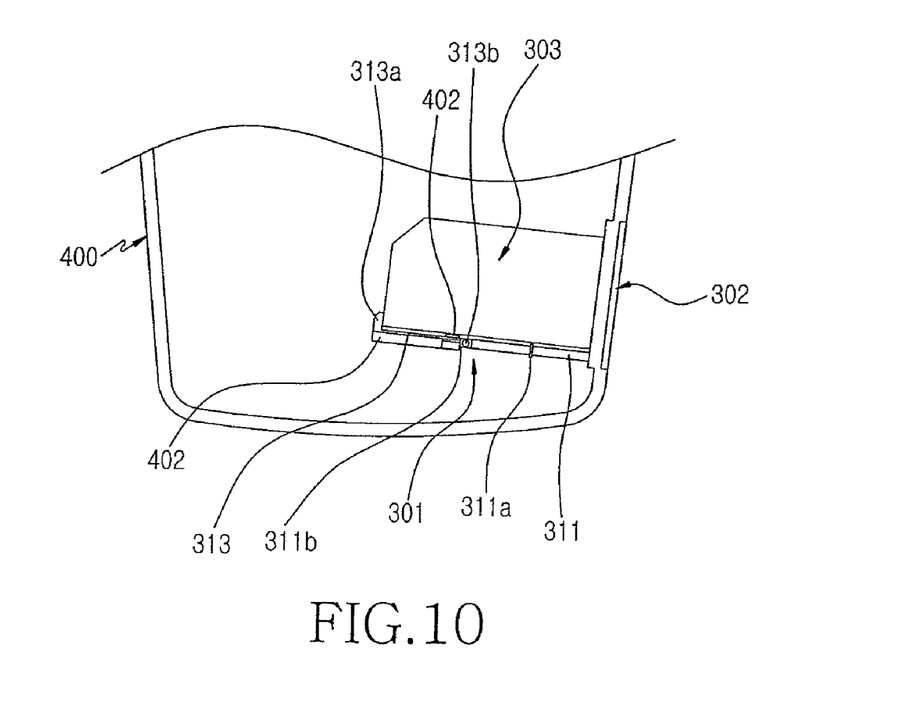
FIG. 10 is a sectional view illustrating a state where the SIM card is installed in the portable terminal shown in FIG. 8.

FIG. 7 is a perspective view of an apparatus 300 for detachably installing a Subscriber Identity Module (SIM) card in a portable terminal 400 according to another exemplary embodiment of the present invention, FIG. 8 is a perspective view of a portable terminal 400 provided with the apparatus 300 shown in FIG. 7, FIG. 9 is a perspective view illustrating a state where a sliding member 301 of the apparatus 300 for detachably installing a SIM card in a portable terminal shown in FIG. 8 is moved out, and FIG. 10 is a sectional view illustrating a state where a SIM card 303 is installed in the portable terminal 400 shown in FIG. 8. As shown in FIGS. 7 to 10, the SIM card installing apparatus 300 of the portable terminal 400 according to another exemplary embodiment of the present invention includes a sliding member 301 and a cover 302. In the exemplary embodiment, the SIM card installing apparatus 300 is installed in an opening 401 disposed on one side of the portable terminal 400 to allow the SIM card 303 to be loaded into and out of the portable terminal 400. That is, the SIM card 303 moves in and out longitudinally through the opening 401 by the SIM card installing apparatus 300, and upon moving in, one end thereof is inserted into the terminal 400.

The sliding member 301 is slidably coupled to the portable terminal 400, and is disposed parallel with the SIM card 303. The movement of the sliding member 301 allows the SIM card to move in and out through the opening 401. In addition, the sliding member 301 consists of first and second sliders 311 and 313 arranged in series, wherein the first slider 311 is located on a first portion of one side of the SIM card 303, and the second slider 313 is located on a second portion of the one side of the SIM card.

The first slider 311 is positioned adjacent to the opening 401 when loaded therein, and is made of a soft (i.e., flexible) material such as urethane, so that the first slider may be deformed by an external force. Further, the first slider 311 is provided with a slide projection 311a formed along an outer circumference thereof.

The second slider 313 extends from an end of the first slider 311, and is made of a relatively rigid material. The second slider 313 is provided with a slide hook 313a bent and extending from an end thereof. When the SIM card 303 moves in and out through the opening 401, the slide hook 313a supports a portion of one end of the SIM card 303.

One of the first and second sliders 311 and 313 is provided with a connecting hole 311b, and the other slider is provided with a connecting protrusion 313b. As the connecting protrusion 313b is fitted into the connecting hole 311b, the first and second sliders 311 and 313 are connected with each other. In the present exemplary embodiment, the first slider 311 is provided with the connecting hole 311b, and the second slider 313 is provided with the connecting protrusion 313b. Alternatively, the first and second sliders 311 and 313 may be integrated into one piece by an injection molding process.

The cover 302 is provided to an end portion of the sliding member 301 in such a manner as to be connected to the first slider 311, so that as the sliding member 301 slides, it opens and closes the opening 401. In addition, the cover 302 is provided at one surface with at least one cover projections 321 made of a soft material. The cover projection 321 engages the opening 401. Here, the cover 302 engages the opening 401 by the cover projections 321 so that it maintains the opening 401 in a closed state and protects the SIM card 303 disposed in the terminal 400.

The portable terminal 400 is provided with a slide hole 411 adjacent to the opening 401. The slide hole 411 is a passage through which the sliding member 301 passes. In addition, the terminal 400 is provided with a pair of guide projections 402 for guiding the sliding movement of the sliding member 301. That is, the sliding member 301 extends through the slide hole 411 and engages the terminal 400 with a portion of the outer face thereof surrounded by the guide projections 402. Thus, the sliding member 301 slides along the slide hole 411 and the guide projections 402 while being guided by the same.

Meanwhile, when the slide part 301 passes through the slide hole 411, the slide hole 411 is positioned between the slide projection 311a and the cover 302. When the SIM card 303 disposed inside the terminal 400 is drawn out through the opening 401, the slide projection 311a comes into contact with an inner surface around the slide hole 411. At the same time, the slide hook 313a is blocked by any one of guide projections 402, particularly by a guide projection positioned on a location where the slide hook 313a is bent. Thus, the sliding member 301 is prevented from being detached from the terminal 400, and is limited in its movement range. Specifically, the sliding member 301 moves in and out through the slide hole 411 within a range from a point with which the cover 302 is connected to a point where the slide projection 311a is formed. Thus, only a portion of the first slider 311 is exposed to the outside.

The SIM card 303 is substantially parallel with the sliding member 301 between the cover 302 and the slide hook 313a, so that it can move in and out through the opening 401 while moving together with the sliding member 301. This is because the slide hook 313a supports the SIM card 303. Then, when the sliding member 301 moves out through slide hole 411, the SIM card 303 is drawn out through the opening 401. Here, since the sliding member 301, particularly the first slider 311, is made of a soft material, the sliding member can be deformed from the state of contacting one side of the SIM card to the state of being separated from the side of the SIM card. In addition, the cover 302 is separated from the other end of the SIM card 303. Thus, the SIM card can be separated from the terminal 400 through the opening 401.

Meanwhile, when the SIM card 303 moves in the terminal through the opening 401, the sliding member 301 is moved into the terminal through the slide hole 411. When the SIM card 303 is inserted into the terminal through the opening 401 from the state where it is separated from the terminal 400, the sliding member 301, particularly the slide hook 313a, is moved inside the terminal 400 by the movement of the SIM card 303. Thus, while the SIM card 303 is inserted into the terminal through the opening 401, the cover 302 is moved toward a position to close the opening 401.

A SIM socket (not shown) is provided on the inside of the terminal. The SIM card 303 is loaded into the SIM socket while being disposed on the sliding member 301 and slides inside the terminal. When the SIM card 303 is loaded into the SIM socket, the terminal 400 is in a state to receive, from the SIM card, data including a subscriber's personal information such as a password, a phone number, a network number, and the like.

Figure 11:
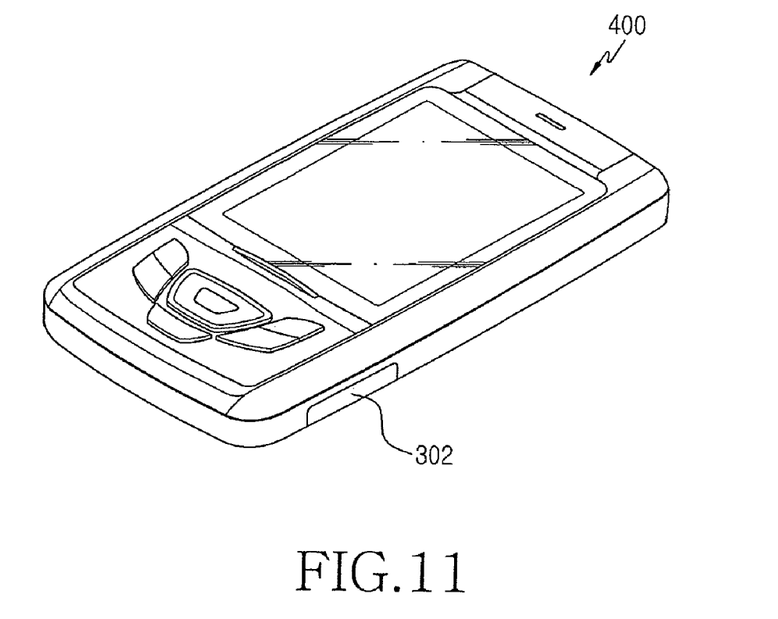
FIG. 11 is a perspective view of an exemplary embodiment of a portable terminal provided with the apparatus shown in FIG. 7.
Figure 12:
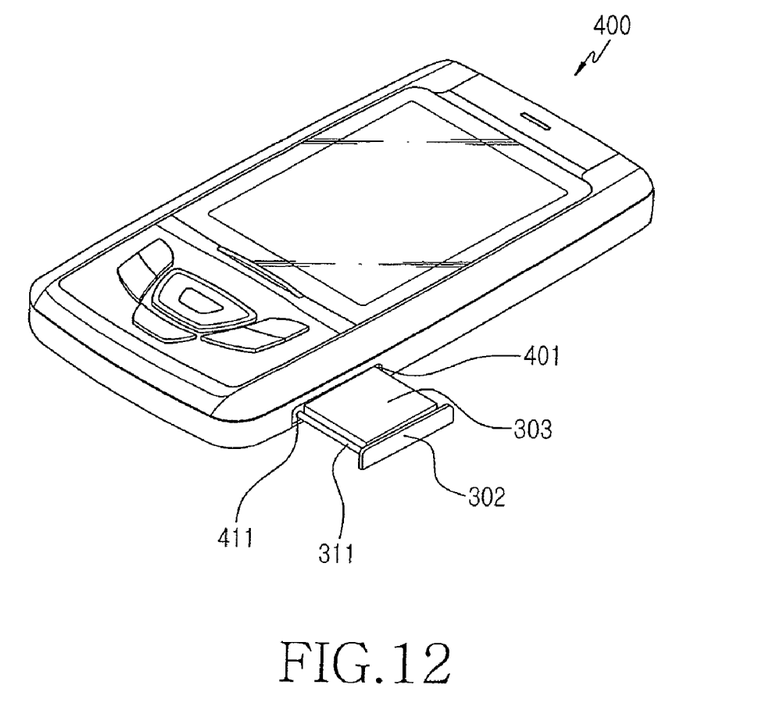
FIG. 12 is a perspective view illustrating a state where a cover of the apparatus shown in FIG. 7 is separated from the portable terminal.
Figure 13:
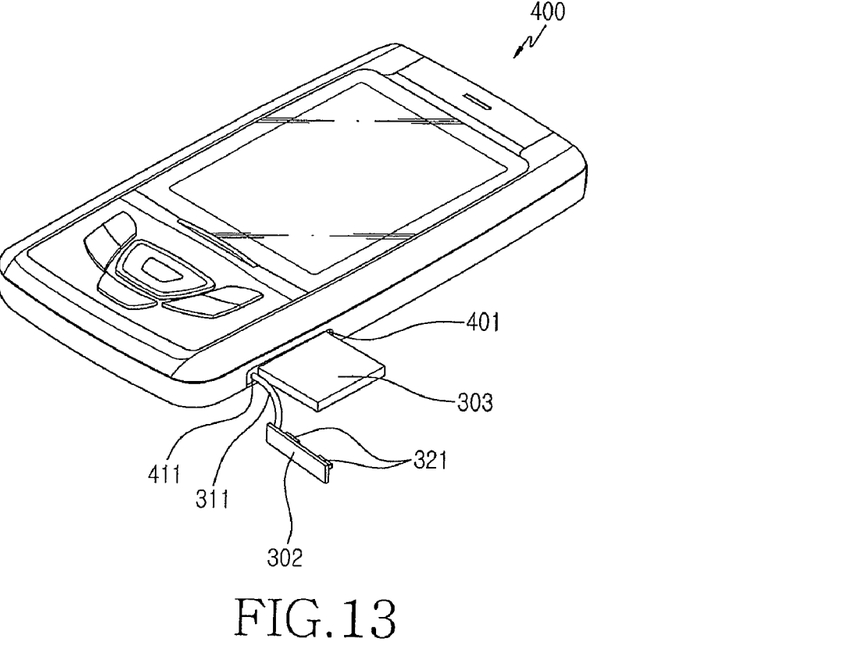
FIG. 13 is a perspective view illustrating a state where a cover of the apparatus shown in FIG. 7 is separated from the SIM card.
Figure 14:
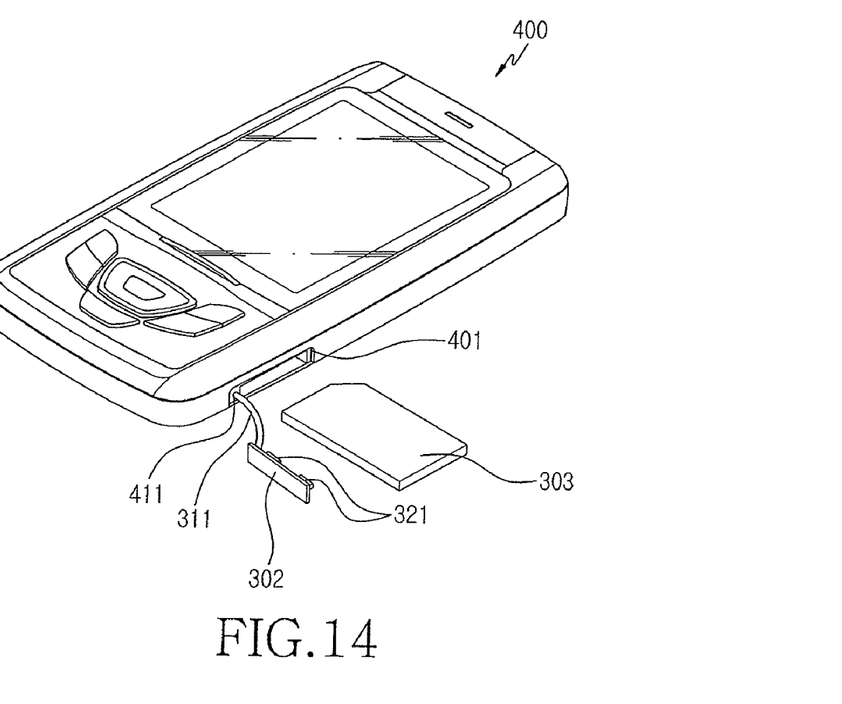
FIG. 14 is a perspective view illustrating a state where the SIM card is separated from the apparatus shown in FIG. 7.

FIG. 11 is a perspective view of the portable terminal 400 provided with the apparatus 300 shown in FIG. 7, FIG. 12 is a perspective view illustrating the state where the cover 302 of the apparatus 300 shown in FIG. 7 is separated from the portable terminal 400, FIG. 13 is a perspective view illustrating the state where the cover 302 of the apparatus 300 shown in FIG. 7 is separated from the SIM card 303, and FIG. 14 is a perspective view illustrating the state where the SIM card 303 is separated from the apparatus 300 shown in FIG. 7. The operation of the SIM card installing apparatus 300 of the portable terminal 400 will be described with reference to FIGS. 11 to 14.

The SIM card 303 is disposed between the cover 302 and the slide hook 313a. At this time, as the cover 302 closes the opening 401, the SIM card 303 is loaded into the SIM socket. In addition, the cover protrusion 321 engages the opening 401. Thus, the cover 302 is closes the opening 401 and faces one end face of the SIM card 303.

To separate the SIM card 303 from the terminal 400, the opening 401 is first opened. Here, as the cover 302 is separated from the opening 401, the sliding member 301 is also slid. In addition, the SIM card 303 is unloaded from the SIM socket while being supported by the slide hook 313a, and is drawn out through the opening 401.

When the sliding member 301 continuously moves out, the slide projection 311a and the slide hook 313b are respectively blocked by the edge portion of the slide hole 411 and the guide projection 402. In addition, the SIM card 303 is exposed to the outside of the terminal 400 through the opening 401. At this time, the sliding member 301, particularly the first slider 311, can be deformed by a user so as to be separated away from one side of the SIM card 303 because it is made of a soft material. Further, the cover 302 can be separated from the other end face of the SIM card 303. Thus, a user can separate the SIM card from the terminal 400 without hindrance by the sliding member 301 and the cover 302.

When loaded again into the terminal 400, the SIM card 303 is inserted into the terminal 400 through the opening 401. Here, one end of the SIM card 303 is supported by the slide hook 313a. Thus, as the SIM card 303 moves in the terminal 400, the sliding member 301 also moves inside the terminal 400 through the slide hole 411.

The SIM card 303 moves inside the terminal 400 until the cover 302 is blocked by the outer edge of the slide hole 411. When the cover 302 is blocked by the outer edge of the slide hole 411, the SIM card 303 is completely inserted into the terminal through the opening 401, and the cover 302 covers the opening 401. Here, the SIM card 303 is loaded into the SIM socket, so that the terminal 400 is in a state to receive, from the SIM card, data including subscriber's personal information such as a password, a phone number, a network number, and the like.

As set forth above an exemplary embodiment of an apparatus for detachably installing a SIM card in a portable terminal includes an opening provided to the portable terminal, a sliding member slidably coupled to the terminal to move in and out through the opening, and a cover extending from the sliding member to open and close the opening. The disclosed embodiment is convenient to use by moving the sliding member and placing a SIM card on the sliding member to install the SIM card on the portable terminal. Moreover, the SIM card is prevented from being damaged while being unloaded from the portable terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for detachably installing a smart card in a portable terminal, the apparatus comprising:
   an opening provided on an exterior surface of the portable terminal;
   a sliding member slidably coupled to the terminal to move in and out of the opening and comprising a first slider extending from the cover and a second slider extending from an end of the first slider; and
   a cover on an end portion of the sliding member to open and close the opening as the sliding member moves such that the exterior surface of the portable terminal comprises the cover when the opening is closed,
   wherein the smart card engages with the sliding member to move in and out through the opening by the movement of the sliding member, and
   wherein the second slider is bent at one end to surround a portion of a buffer and thereby securely fix the buffer.

2. The apparatus as claimed in claim 1, wherein the smart card comprises a Subscriber Identity Module (SIM).

3. The apparatus as claimed in claim 1, wherein the cover further includes a cover projection extending from one surface, the cover projection engaging the card placed on the sliding member with the cover.

4. The apparatus as claimed in claim 1,
   wherein a portion of the smart card is placed on the first slider, and
   a second portion of the smart card is placed on the second slider.

5. The apparatus as claimed in claim 4,
   wherein a shape of the first slider is usually curved such that it is parallel to the second slider where the first and second sliders connect and bends away where the first slider and cover connect,
   wherein as the smart card moves into the opening the first slider straightens to be parallel to the second slider, and
   wherein as the smart card moves out of the opening and the cover is separated from the smart card, the shape of the first slider curves so that the first slider moves gradually away from the smart card when moving from a direction of the second slider side to a direction of the cover.

6. The apparatus as claimed in claim 4,
   wherein the cover and the first slider comprise a flexible material, and
   the second slider comprises a relatively rigid material.

7. The apparatus as claimed in claim 4,
   further comprising the buffer on the second slider to support the smart card placed on the sliding member,
   the buffer comprising a soft material to be deformed by an external force.

8. The apparatus as claimed in claim 1,
   further comprising a smart card socket provided in the opening of the portable terminal,
   wherein the smart card is detachably loaded into the smart card socket.

9. The apparatus as claimed in claim 8, wherein when the smart card is placed on the sliding member, the smart card is installed in the smart card socket.

10. An apparatus for detachably installing a smart card in a portable terminal, the apparatus comprising:

an opening on an exterior surface of the portable terminal for receiving a smart card;

a sliding member slidably coupled to the terminal;

a slide hole provided adjacent to the opening to form a passage through which the sliding member passes; and at least one guide projection provided inside the terminal to surround a portion of a face of the sliding member; and a cover provided on an end portion of the sliding member to open and close the opening such that the exterior surface of the portable terminal comprises the cover when the opening is closed, wherein the smart card is disposed substantially parallel with the sliding member while being inserted into the opening as the cover closes the opening, and the smart card is drawn out from the opening as the cover opens the opening.

11. The apparatus as claimed in claim 10, wherein the smart card comprises a Subscriber Identity Module (SIM).

12. The apparatus as claimed in claim 10,
wherein the slide hole and the at least one guide projection guide the movement of the sliding member.

13. The apparatus as claimed in claim 12, further comprising:
a slide projection formed along a face of the sliding member; and
a slide hook extending from an end of the sliding member,
wherein the slide projection is blocked by an edge portion of the slide hole, and
the slide hook is guided by the at least one guide projection, thereby preventing the sliding member from being detached from the opening.

14. The apparatus as claimed in claim 13,
wherein the smart card is disposed between the cover and the slide hook, and
as the sliding member moves, the smart card moves accordingly in and out through the opening.

15. The apparatus as claimed in claim 10,
wherein the sliding member includes a first slider extending from the cover and a second slider extending from an end of the first slider,
a portion of the smart card is disposed substantially parallel with the first slider, and
a second portion of the smart card is disposed substantially parallel with the second slider.

16. The apparatus as claimed in claim 15, further comprising:
a connecting hole provided in one of the first and second sliders; and
a connecting protrusion provided in the other one of the first and second sliders,
wherein when the connecting protrusion is connected with the connecting hole, the first and second sliders are connected with each other.

17. The apparatus as claimed in claim 15, further comprising:
a slide hole provided adjacent to the opening to form a passage through which the sliding member passes; and
a slide projection formed along an outer face of the first slider,
wherein the slide projection engages the slide hole to restrict the movement range of the first slider.

18. The apparatus as claimed in claim 17, wherein as the sliding member moves, the first slider between the cover and the slide projection passes through the slide hole.

19. The apparatus as claimed in claim 18, wherein as the cover is separated from the smart card, the shape of the first slider is deformed so that the first slider moves gradually away from the smart card.

20. The apparatus as claimed in claim 15,
wherein the cover and the second slider comprise a relatively rigid material, and
the first slider comprises a flexible material.

21. The apparatus as claimed in claim 10,
further comprising at least one cover protrusion on the cover,
the at least one cover protrusion engaging the opening, to maintain the cover in a closed state.

22. The apparatus as claimed in claim 10,
further comprising a smart card socket provided in the portable terminal,
wherein the smart card is detachably loaded into the smart card socket.

23. A portable terminal comprising a removable smart card, the portable terminal comprising:
a housing comprising an opening in an exterior surface of the housing for allowing a smart card to be inserted into the portable terminal;
a cover for closing the opening in the housing such that the exterior surface of the housing comprises the cover when the opening is closed; and
a sliding member connected to the cover for receiving and transporting the smart card,
the sliding member comprising a first slider comprising a flexible material and a second slider comprising a relatively rigid material,
wherein the first slider connects the second slider to the cover and the second slider engages the smart card so that the smart card is removed from the opening in the housing when the cover is opened, and
wherein the second slider is bent at one end to surround a portion of a buffer and thereby securely fix the buffer.

24. The portable terminal of claim 23, further comprising the buffer disposed on the second slider to engage the smart card.

25. The portable terminal of claim 23,
further comprising a cover projection disposed on the cover,
the cover projection engaging the smart card disposed on the sliding member.

26. The portable terminal of claim 23, further comprising a hook extending from the second slider to engage the smart card.

27. The portable terminal of claim 23,
further comprising a slide aperture disposed adjacent to the opening on the housing,
the slide aperture receiving the sliding member.

28. The portable terminal of claim 27,
further comprising a slide projection disposed on the sliding member,
the slide projection engaging the slide aperture to restrict a movement of the sliding member.

* * * * *